(12) United States Patent
Li (10) Patent No.: US 9,454,058 B2
(45) Date of Patent: Sep. 27, 2016

(54) COLOR ELECTROPHORETIC DISPLAY PANEL AND FABRICATING METHOD THEREOF, AND DISPLAY DEVICE

(71) Applicant: BOE TECHNOLOGY GROUP CO., LTD., Beijing (CN)

(72) Inventor: Mingchao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 51 days.

(21) Appl. No.: 14/345,849

(22) PCT Filed: Dec. 5, 2013

(86) PCT No.: PCT/CN2013/088566
§ 371 (c)(1),
(2) Date: Mar. 19, 2014

(87) PCT Pub. No.: WO2014/190708
PCT Pub. Date: Dec. 4, 2014

(65) Prior Publication Data
US 2015/0160526 A1   Jun. 11, 2015

(30) Foreign Application Priority Data

May 30, 2013   (CN) .................... 2013 1 0210683

(51) Int. Cl.
*G02B 26/00*   (2006.01)
*G02F 1/167*   (2006.01)
(Continued)

(52) U.S. Cl.
CPC ........... *G02F 1/167* (2013.01); *G02F 1/13306* (2013.01); *G09G 3/344* (2013.01); *G02F 1/133512* (2013.01);
(Continued)

(58) Field of Classification Search
CPC ... G09G 3/344; G02F 1/167; G02F 1/13306; G02F 1/133512; G02F 2001/1678; G02F 2001/1672; Y10T 29/4913
USPC ......................... 359/296, 900; 345/105, 107
See application file for complete search history.

(56) References Cited

U.S. PATENT DOCUMENTS

2003/0030884 A1*   2/2003   Minami ................. G02F 1/167
                                                                    359/296
2007/0024948 A1     2/2007   Hirano et al.
(Continued)

FOREIGN PATENT DOCUMENTS

CN   101252156 A   8/2008
CN   102636933 A   8/2012
(Continued)

OTHER PUBLICATIONS

First Chinese Office Action dated May 5, 2015; Appln. No. 201310210683.9.
(Continued)

*Primary Examiner* — Tuyen Tra
(74) *Attorney, Agent, or Firm* — Ladas & Parry LLP (57) ABSTRACT

Embodiments of the present invention provide a color electrophoretic display panel and a fabricating method thereof, and a display device provided with the color electrophoretic display panel. The color electrophoretic display panel comprises: a plurality of pixel units each of which comprises more than two different colors of electrophoretic particles, and the threshold voltages driving the different colors of electrophoretic particles are different.

12 Claims, 4 Drawing Sheets

(51) Int. Cl.
  *G09G 3/34* (2006.01)
  *G02F 1/133* (2006.01)
  *G02F 1/1335* (2006.01)
(52) U.S. Cl.
  CPC ............... *G02F 2001/1672* (2013.01); *G02F 2001/1678* (2013.01); *Y10T 29/4913* (2015.01)

(56) References Cited

U.S. PATENT DOCUMENTS

| | | |
|---|---|---|
| 2007/0236768 A1 | 10/2007 | Kawahara et al. |
| 2008/0157064 A1 | 7/2008 | Tsai et al. |
| 2008/0303778 A1 | 12/2008 | Machida et al. |
| 2009/0153943 A1 | 6/2009 | Machida et al. |
| 2012/0200610 A1 | 8/2012 | Sakamoto et al. |
| 2012/0242565 A1 | 9/2012 | Noh et al. |
| 2012/0327504 A1 | 12/2012 | Kayashima et al. |
| 2013/0057944 A1* | 3/2013 | Kim ................ G02F 1/167 359/296 |
| 2013/0222883 A1* | 8/2013 | Kayashima ........ C08L 25/02 359/296 |

FOREIGN PATENT DOCUMENTS

| | | |
|---|---|---|
| CN | 102654706 A | 9/2012 |
| CN | 102707536 A | 10/2012 |
| CN | 102838886 A | 12/2012 |
| CN | 103309115 A | 9/2013 |
| JP | 2007140110 A | 6/2007 |

OTHER PUBLICATIONS

International Search Report (Chinese language) issued on Feb. 27, 2014 for PCT/CN2013/088566, 13 pages.
English abstract of JP 2007140110A, listed above, 1 page.
English abstract of CN 102636933A, listed above, 2 pages.
English abstract of CN 103309115A, listed above, 1 page.
Second Chinese Office Action dated Oct. 9, 2015; Appln. No. 201310210683.9.
International Preliminary Report on Patentability issued Dec. 1, 2015; PCT/CN2013/088566.

* cited by examiner

COLOR ELECTROPHORETIC DISPLAY PANEL AND FABRICATING METHOD THEREOF, AND DISPLAY DEVICE

CROSS REFERENCE TO RELATED APPLICATIONS

This application is based on International Application No. PCT/CN2013/088566 filed on Dec. 5, 2013, which claims priority to Chinese National Application No. 201310210683.9 filed on May 30, 2013. The entire contents of each and every foregoing application are incorporated herein by reference.

TECHNICAL FIELD

Embodiments of the present invention relate to a color electrophoretic display panel and a fabricating method thereof, and a display device.

BACKGROUND

Electronic paper (E-Paper for short) is a display device very close to paper and has the characteristics of free bending and advantages such as high contrast, high resolution, large view angle, small power consumption and low production cost. The display principle of the electronic paper is also different from general flat panel displays, and the electronic paper does not need a backlight source and can display images by way of reflecting environment light, and can maintain the initially displayed image without applying electricity. Therefore, the electronic paper is widely used on occasions such as price tag in retail stores, digital signage, bus station timetable, digital bulletin board, mobile phone screen and electronic book reader. The electronic paper based on an electrophoretic technology is the most widely used currently.

The display manner of the electronic paper based on the electrophoretic technology can achieve full colors through mixing colors, while the display manner of color mixing renders the phenomenon of color mixture, so that the electronic paper cannot satisfactorily display single color such as red, green and blue. To achieve color electrophoretic display, the electrophoretic display of a single color may go with a color filter, while the color filter's absorption of light results in sharply lowered brightness of the electrophoretic display device.

SUMMARY

An embodiment of the present invention provides a color electrophoretic display panel, comprising: a plurality of pixel units each of which comprises more than two different colors of electrophoretic particles, and threshold voltages driving the electrophoretic particles of different colors are different.

In an example, the more than two different colors of electrophoretic particles comprise a first colored electrophoretic particle, a second colored electrophoretic particle and a third colored electrophoretic particle, and each of the pixel units further comprises a white particle, and the threshold voltages driving the first colored electrophoretic particle, the second colored electrophoretic particle and the third colored electrophoretic particle are respectively a first threshold voltage $E_A$, a second threshold voltage $E_B$ and a third threshold voltage $E_C$.

In an example, $E_C < E_B < E_A$, the respective pixel units are configured to be able to apply external drive voltages $E_1$, $E_2$ and $E_3$, wherein, $E_C \leq E_1 \leq E_B \leq E_2 \leq E_A \leq E_3$.

In an example, the pixel units are configured to have the following driving manners:
 a driving manner for the pixel units displaying a first color is to apply the voltage $E_3$ and then apply a voltage $-E_2$ to the pixel units;
 a driving manner for the pixel units displaying a second color is to apply the voltage $E_2$ and then apply a voltage $-E_1$ to the pixel units; and
 a driving manner for the pixel units displaying a third color is to apply the voltage $E_1$ to the pixel units.

In an example, the colors of the first colored electrophoretic particle, the second colored electrophoretic particle and the third colored electrophoretic particle comprise red, green, blue, carmine, cyan or yellow.

In an example, the color electrophoretic display panel comprises:
 an upper substrate;
 a lower substrate opposite to the upper substrate;
 a plurality of pixel electrodes spaced apart, provided at a side of the lower substrate facing the upper substrate, and each of the pixel electrodes corresponds to one pixel unit;
 a common electrode provided at a side of the upper substrate facing the lower substrate;
 an electrophoretic layer provided between the pixel electrodes and the common electrode and comprising an oil solution which is mixed with the more than two different colors of electrophoretic particles; and
 a partition wall which partitions the respective pixel units and partitions the electrophoretic layer within areas of the respective pixel units.

In an example, the color electrophoretic display panel further comprises: a black matrix provided on the upper substrate and corresponding to the partition wall.

In an example, a material of the common electrode is a transparent conductive high molecular material, and the common electrode is formed with nano gold particles at its surface.

In an example, a material of the partition wall is a high molecular material.

Another embodiment of the present invention further provides a fabricating method of a color electrophoretic display panel, comprising:
 forming a plurality of pixel electrodes spaced apart on a lower substrate;
 spin-coating a solution for forming an electrophoretic layer onto the lower substrate formed with the pixel electrodes, and the solution comprises electrophoretic particles of more than two different colors, and threshold voltages driving the different colors of electrophoretic particles are different;
 forming a common electrode on an upper substrate;
 forming a black matrix and a partition wall on the upper substrate; and
 cell-assembling the upper substrate and the lower substrate, and a side of the lower substrate where the pixel electrodes are formed faces a side of the upper substrate where the common electrode is formed.

In an example, a material of the common electrode is a transparent conductive high molecular material, subsequent to the step of forming the common electrode on the upper substrate, the method further comprises a step of forming nano gold particles on the common electrode is further contained.

In an example, forming the common electrode on the upper substrate comprises:

forming a polymerizable monomer layer on the upper substrate; and     applying a voltage of a certain frequency to the polymerizable monomer layer so that the polymerizable monomer is polymerized to form a conductive high molecular layer which serves as the common electrode.

In an example, subsequent to the step of forming the conductive high molecular layer, the step of subjecting the conductive high molecular layer to a patterning process to serve as a partitioned common electrode is further contained.

In an example, forming the nano gold particles on the common electrode comprises:

placing the upper substrate formed with the common electrode in a nano gold solution, the nano gold particles conducting self-assembling on a surface of the conductive high molecular material, and forming evenly distributed nano gold particle projections.

In an example, forming the plurality of pixel electrodes spaced apart on the lower substrate comprises:

forming a pattern of a first transparent conductive layer on the lower substrate;

forming a pattern of an insulating layer at a gap of the pattern of the first transparent conductive layer on the lower substrate;

forming a pattern of a second transparent conductive layer on the insulating layer which separates the pattern of the first transparent conductive layer and the pattern of the second transparent conductive layer, and the pattern of the first transparent conductive layer and the pattern of the second transparent conductive layer constituting the plurality of pixel electrodes spaced apart.

Another embodiment of the present invention provides a display device comprising the above color electrophoretic display panel.

The above technical solutions provided by the present invention have following advantages: each pixel unit is filled with more than two different colors of electrophoretic particles, and the threshold voltages driving the different colors of electrophoretic particles are different, thus, through applying a proper drive voltage to the pixel units, the electrophoretic particles of a single color suspend to the upper substrate so that the pixel unit displays a single color, and then the display of a single color is achieved and the phenomenon of color mixture is avoided.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The color electrophoretic display panel provided by embodiments of the present invention comprises: a plurality of pixel units each of which comprises more than two different colors of electrophoretic particles, and threshold voltages driving the different colors of electrophoretic particles are different. Herein the threshold voltage is the minimum drive voltage that can drive the electrophoretic particles to move. In the situation that the external drive voltage is smaller than the threshold voltage, the electrophoretic particles do not move under the effect of the voltage.

In the color electrophoretic display panel provided by the embodiments of the present invention, each pixel unit is filled with more than two different colors of electrophoretic particles, and the threshold voltages driving the different colors of electrophoretic particles are different, thus, through applying a proper drive voltage to the pixel units, the electrophoretic particles of a single color suspend to the upper substrate so that the pixel unit displays a single color, and then the display of a single color is achieved and the phenomenon of color mixture is avoided.

Figure 1:
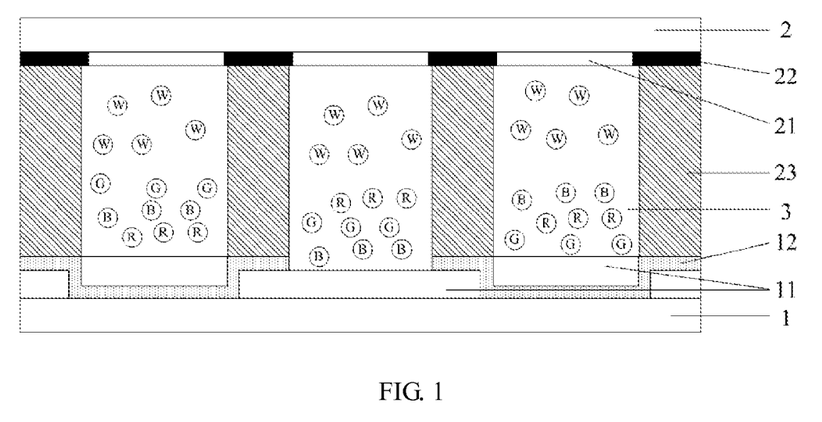
FIG. 1 is a schematic diagram of a structure of a color electrophoretic display panel provided by an embodiment of the present invention.

As illustrated in FIG. 1, the color electrophoretic display panel provided by the embodiments of the present invention comprises a lower substrate 1, an upper substrate 2, pixel electrodes 11, common electrode 21, a partition wall 23 and a electrophoretic layer 3. The plurality of pixel electrodes 11 spaced apart are provided on the lower substrate 1 and are spaced apart through the insulating layer 12, and each of the pixel electrodes 11 corresponds to one pixel unit. The common electrode 21 is provided on the upper substrate 2, and can be a planar common electrode 21 formed on the upper substrate 2 and can also be partitioned to be a plurality of parts each of which corresponds to one pixel unit. The electrophoretic layer 3 is provided between the pixel electrodes 11 and the common electrode 21. The electrophoretic layer 3 comprises an oil solution in which more than two different colors of electrophoretic particles are mixed, and the threshold voltages driving the different colors of electrophoretic particles are different. The partition wall 23 is provided between the lower substrate 1 and the upper substrate 2, and partitions the pixel units and partitions the electrophoretic layer 3 within the areas of the pixel units, and the material of the partition wall 23 is preferably a high molecular material. Furthermore, the black matrix 22 is provided on the upper substrate 2 and is provided at the position corresponding to the partition wall 23.

In the embodiments of the present invention, the oil solution of the electrophoretic layer 3 is mixed with three different colors of electrophoretic particles, comprising a first colored electrophoretic particle, a second colored electrophoretic particle and a third colored electrophoretic particle. In addition, the oil solution is mixed with a white particle (W). The threshold voltages driving the first colored electrophoretic particle, the second colored electrophoretic particle and the third colored electrophoretic particle are respectively the first threshold voltage $E_A$, the second threshold voltage $E_B$ and the third threshold voltage $E_C$. For example, the white particle is a non-charged particle, thus, the movement of the white particle is basically not affected by the external electric field.

For example, the colors of the first colored electrophoretic particle, the second colored electrophoretic particle and the third colored electrophoretic particle comprise red, green, blue, carmine, cyan or yellow. In this embodiment, description is made taking as an example that the three colored electrophoretic particles are respectively blue (B), green (G) and red (R), as illustrated in FIG. 1. The threshold voltages driving the blue, green and red electrophoretic particles are respectively $E_b$, $E_g$ and $E_r$, the white particle is a common suspension particle (for example, a non-charged particle), and conducts Brownian motion in the oil solution.

In this embodiment, description is made taking as an example that the threshold voltage $E_b$ of the blue electrophoretic particle is the largest and the threshold voltage $E_r$ of the red electrophoretic particle is the smallest, that is, $E_r < E_g < E_b$, three different external drive voltages $E_1$, $E_2$ and $E_3$ are provided according to the threshold voltages of the three electrophoretic particles, which meets $E_r \leq E_1 \leq E_g \leq E_2 \leq E_b \leq E_3$.

For example, the above different threshold voltages of the above different colors of electrophoretic particles can be achieved through the different charge to mass ratios of the different colors of electrophoretic particles.

The working manner of displaying an image by the color electrophoretic display panel is as follow:

A voltage $-E_3$ is applied to the pixel units, that is, an electric field $-E_3$ is formed between the pixel electrodes 11 and the common electrode 21, as illustrated in FIG. 1, all the three color electrophoretic particles are absorbed to the pixel electrodes 21, so that all the color electrophoretic particles in the pixel units are located at the lower substrate 1, and then white color is displayed as an initial state.

Figure 2A:
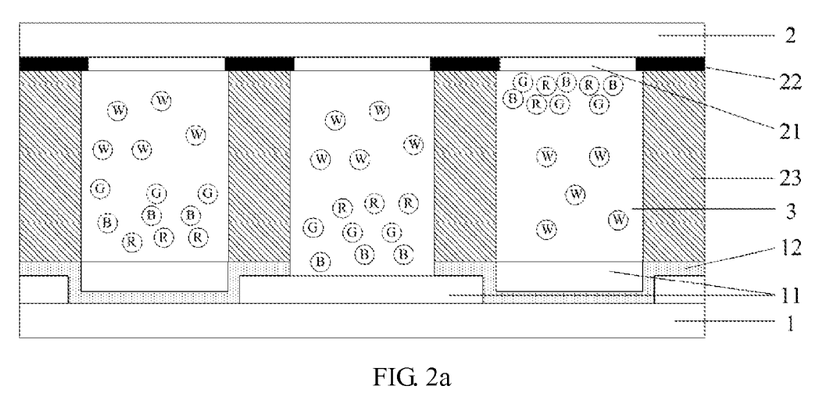
FIGS. 2a-2e are schematic diagrams of the working process of the color electrophoretic display panel provided by the embodiment of the present invention.
Figure 2B:
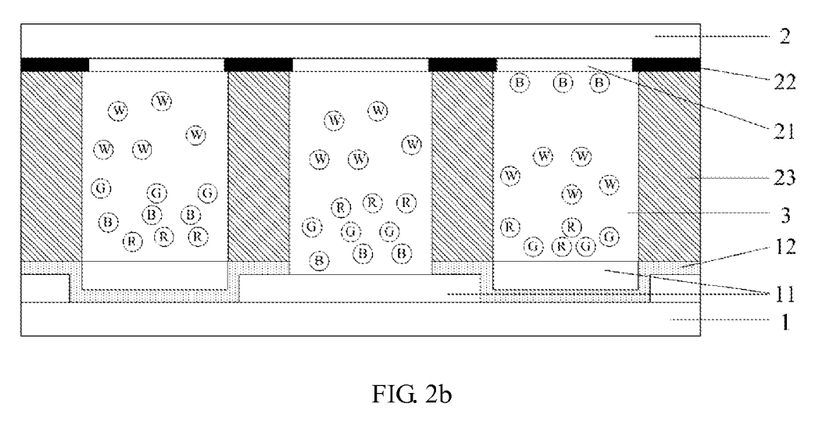

When a certain pixel unit needs to display blue color, the voltage $E_3$ is first applied to the pixel unit, as illustrated in FIG. 2a, all the three color electrophoretic particles are absorbed to the common electrode 21 of the upper substrate 2, then the voltage $-E_2$ is applied to the pixel unit, as illustrated in FIG. 2b, the red and green electrophoretic particles are absorbed to the pixel electrodes 11 of the lower substrate 1, at this moment, only the blue electrophoretic particle is left at the upper substrate 2, so that the pixel unit displays blue color.

Figure 2C:
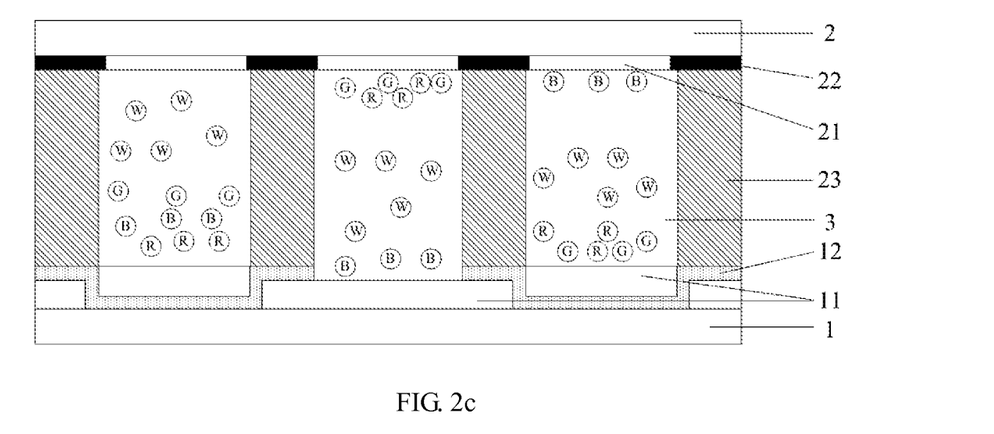
Figure 2D:
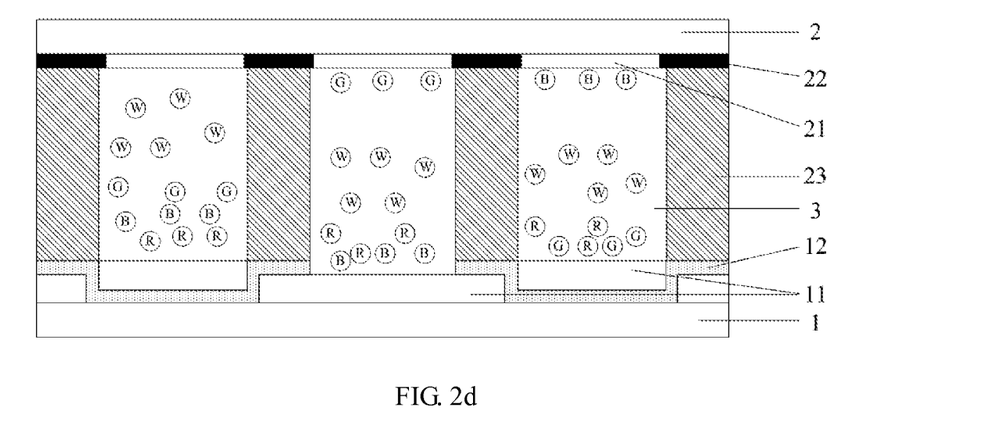

When a certain pixel unit needs to display green color, the voltage $E_2$ is first applied to the pixel unit, as illustrated in FIG. 2c, red and green electrophoretic particles are absorbed to the common electrode 21 of the upper substrate 2, the blue electrophoretic particle is left on the lower substrate 1, then the voltage $-E_1$ is applied to the pixel unit, as illustrated in FIG. 2d, the red electrophoretic particle is absorbed to the pixel electrodes 11 of the lower substrate 1, at this moment, only the green electrophoretic particle is left at the upper substrate 2, so that the pixel unit displays green color.

Figure 2E:
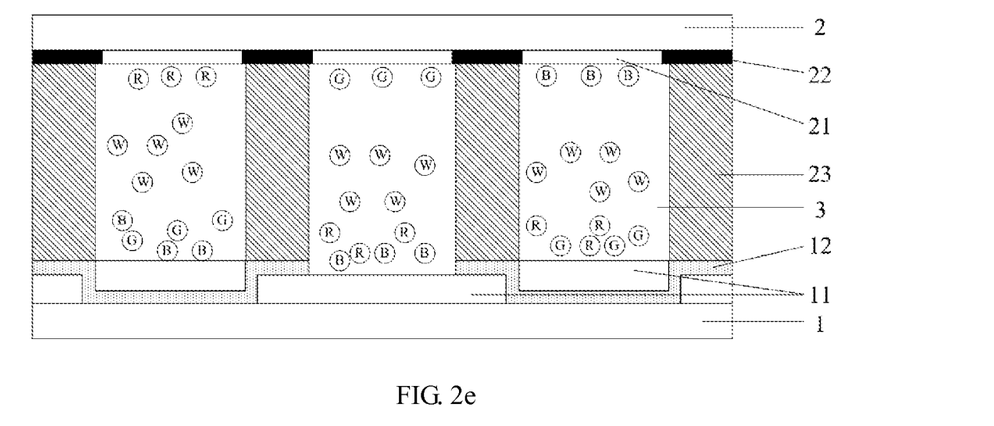

When a certain pixel unit needs to display red color, it is fine to apply the voltage $E_1$ to the pixel unit, as illustrated in FIG. 2e, the red particle is absorbed to the common electrode 21 of the upper substrate 2, the green and blue electrophoretic particles are left at the lower substrate 1, so that the pixel unit displays red color.

In the color electrophoretic display panel provided by the embodiments of the present invention, as each pixel unit is filled with white particle and red, green and blue electrophoretic particles, and the threshold voltages driving the blue, green and red electrophoretic particles are different, through applying a proper drive voltage to the pixel unit, the electrophoretic particle of a single color suspends to the upper substrate 2 so that the pixel unit displays a single color of red, green or blue, and then the display of a single color is achieved and the phenomenon of color mixture is avoided.

Of course, in other embodiments, the relationship of the sizes of the threshold voltages driving the blue, green and red electrophoretic particles may be changed, for example, $E_b < E_g < E_r$, and etc.

Figure 3:
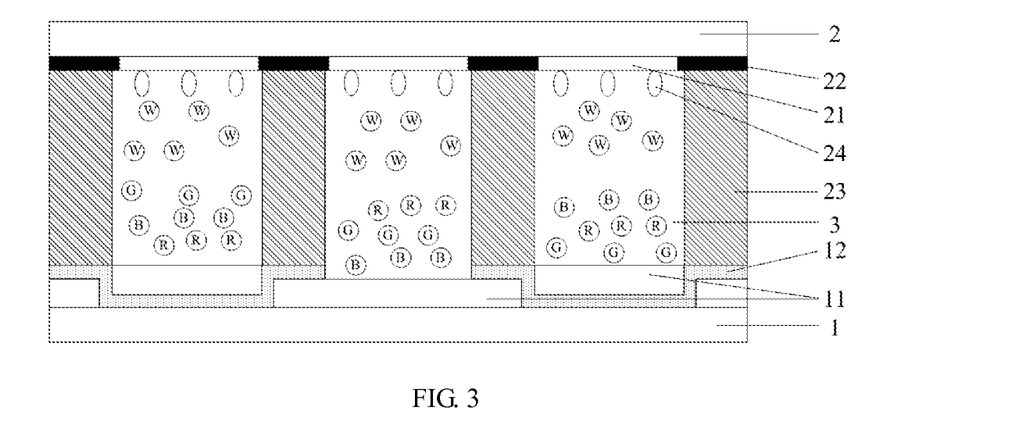
FIG. 3 is a schematic diagram of another implementation manner of a color electrophertic display panel provided by the embodiment of the present invention.

Furthermore, in the embodiments of the present invention, the material of the common electrode 21 is a transparent conductive high molecular material, and the common electrode 21 is formed with nano gold particles 24 at the surface, as illustrated in FIG. 3. The nano gold particles 24 can satisfactorily absorb the electrophoretic particles and thus can better absorb the electrophoretic particles onto the upper substrate 2, then the stability of the image is improved, and the phenomenon of uneven color display rendered by external stress or uneven distribution of electric field is improved.

In addition, it needs to be indicated that driving the electrophoretic particles to be at different positions is achieved through different threshold voltages of the different colors of electrophoretic particles. However, the embodiments of the present invention are not limited to this. For example, different colors of electrophoretic particles can carry different charges. In an example, some colors of particles carry positive charge, some colors of particles carry negative charge, and the threshold voltages of different colors of electrophoretic particles of the particles carrying the same charge are different. In this way, color display can be displayed.

Figure 4A:
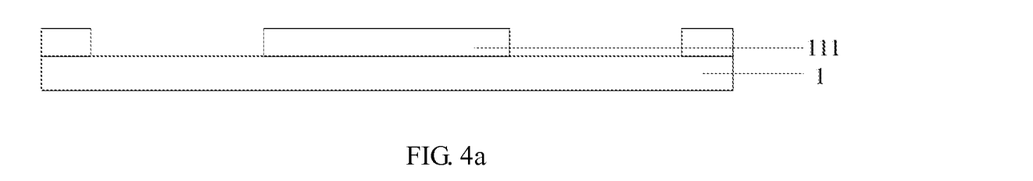
FIGS. 4a-4h are schematic diagrams of a fabricating method of a color electrophoretic display panel provided by the embodiment of the present invention.

The embodiments of the present invention further provide a fabricating method of the color electrophoretic display panel, comprising:

S101, forming a plurality of pixel electrodes spaced apart on a lower substrate;

The step can comprises:

S1011, as illustrated in FIG. 4a, the pattern 111 of a first transparent conductive layer is formed on the lower substrate 1.

A transparent conductive layer is deposited on the lower substrate 1, the material of the transparent conductive layer is preferably indium tin oxides (ITO for short), and the pattern 111 of the first transparent conductive layer is formed through a patterning process and etching.

Figure 4B:
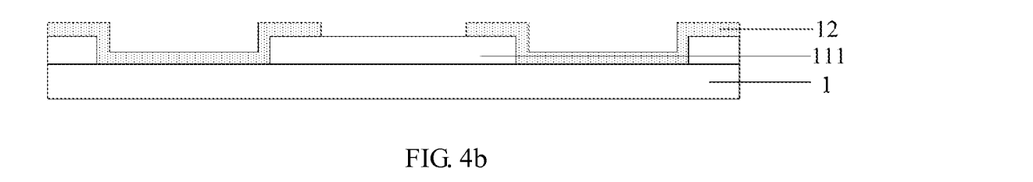

S1012, as illustrated in FIG. 4b, forming the pattern of an insulating layer 12 at the gap of the pattern 111 of the first transparent conductive layer on the lower substrate 1;

A layer of insulating film is deposited on the lower substrate 1, the material of the insulating film is, for example, a nitride of silicon ($SiN_x$), and the thickness is, for example, 3000-4000 Å. The pattern of the insulating layer 12 is formed at the gap of the pattern 111 of the first transparent conductive layer through a patterning process and etching.

Figure 4C:
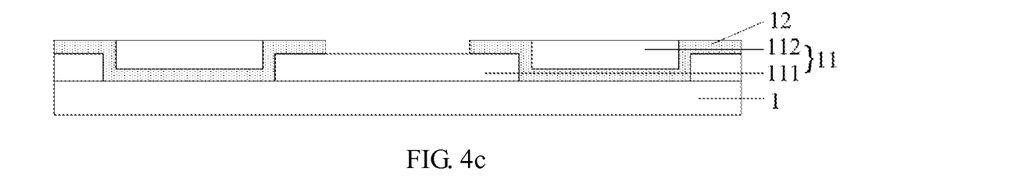

S1013, as illustrated in FIG. 4c, forming the pattern 112 of a second transparent conductive layer on the insulating layer 12 which separates the pattern 111 of the first transparent conductive layer and the pattern 112 of the second transparent conductive layer, and the pattern 111 of the first transparent conductive layer and the pattern 112 of the second transparent conductive layer constituting the plurality of pixel electrodes 11 spaced apart.

The second layer of transparent conductive layer (ITO) is deposited on the lower substrate 1, the graph 112 of the second transparent conductive layer is formed through a composition process and etching, as illustrated in FIG. 4c, the graph 111 of the first transparent conductive layer and the graph 112 of the second transparent conductive layer separated by the insulating layer 12 constitute the pixel electrodes 11.

Of course, the manners of forming the spaced pixel electrodes in the embodiments of the present invention are not limited to the above steps. For example, it is fine to only form a layer of transparent conductive layer, and then the plurality of spaced pixel electrodes are formed through patterning the transparent conductive layer.

Figure 4D:
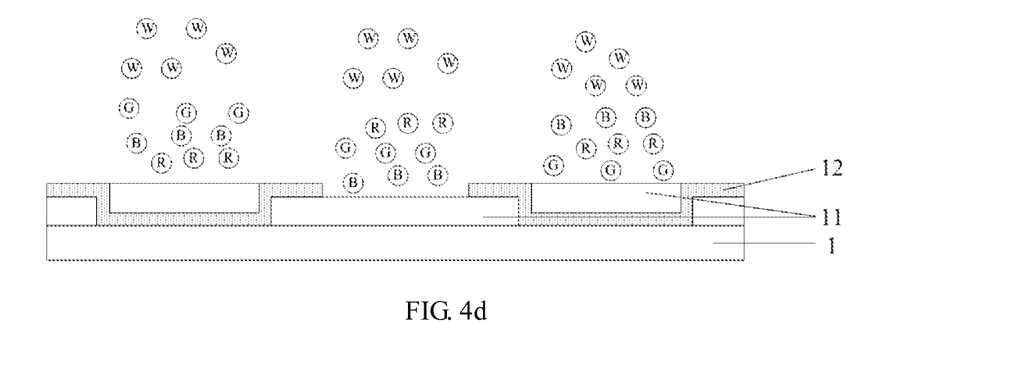

S102, as illustrated in FIG. 4d, spin-coating a solution for forming the electrophoretic layer 3 onto the lower substrate formed with the pixel electrodes, and the solution comprises more than two different colors of electrophoretic particles, for example, blue, green and red electrophoretic particles, and the threshold voltages driving the different colors of electrophoretic particles are different.

Figure 4E:
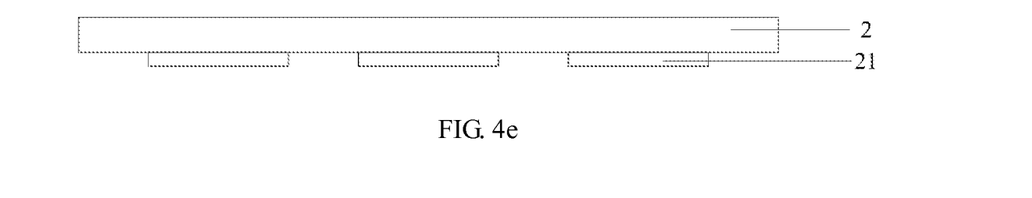

The fabricating method of the color electrophoretic display panel further comprises:

S201, as illustrated in FIG. 4e, forming the common electrode 21 on the upper substrate 2, the material of the common electrode 21 is, for example, a transparent conductive high molecular material. The general formula of the monomer forming the high molecular material is RM-[A]-[B], wherein RM can be a polymerizable end group, A is a rigid structure such as benzene ring or cyclohexane, and B is alkyl.

The step can comprise:

S2011, forming a polymerizable monomer layer on the upper substrate.

For example, a polymerizable monomer is spin-coated on the upper substrate, which can be selected from a common polymerizable monomer with a double bond.

S2012, applying a voltage of a certain frequency to the polymerizable monomer so that the polymerizable monomer is polymerized to form a conductive high molecular layer which serves as the common electrode.

As the frequency of the electric field can affect the diffusion rate of the polymerizable monomer, applying a voltage of a certain frequency can control the mesh size of a high molecular polymer formed of the polymerizable monomer, and then affect the mesh structure of the high molecular polymer. If the frequency of the electric field is low, the polymerizable monomer is diffused quickly, the mesh of the formed high molecular polymer is sparse, the mesh hole is large, and it has a low response speed when serving as the common electrode while has a high off-state transmittance, and the threshold voltage and the saturation voltage are low; if the frequency of the electric field is high, the polymerizable monomer is diffused slowly, the mesh of the formed high molecular polymer is dense, the mesh hole is small, and it has a fast response speed when serving as the common electrode while has a low off-state transmittance, and the threshold voltage and the saturation voltage are high. Therefore, the frequency of the electric field applied to the polymerizable monomer should not be too high or too low.

The voltage used in the embodiments of the present invention is, for example, 20V, the frequency is, for example, 0-1 kHz, and the step is, for example, 200 Hz.

Other process methods can also be used to form the common electrode of the transparent conductive high molecular material, such as spray-coating and spin-coating. In addition, the material for forming the common electrode can also be other transparent conductive materials.

Furthermore, S2013 can be contained: as illustrated in FIG. 4e, subjecting the conductive high molecular layer to a patterning process to serve as the spaced common electrode 21. Specifically, the spaced common electrode 21 can be formed through a patterning process and etching.

Of course, the step S2013 may not be implemented in other embodiments, and a planar common electrode is formed on the upper substrate.

Figure 4F:
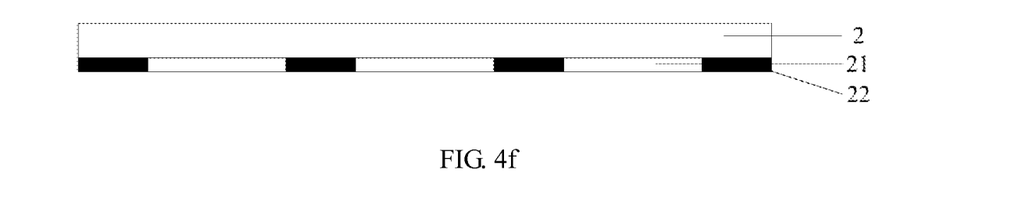

S202, as illustrated in FIG. 4f, depositing and forming the black matrix 22 on the upper substrate 2 which corresponds to the partition parts between the respective pixel units.

Figure 4G:
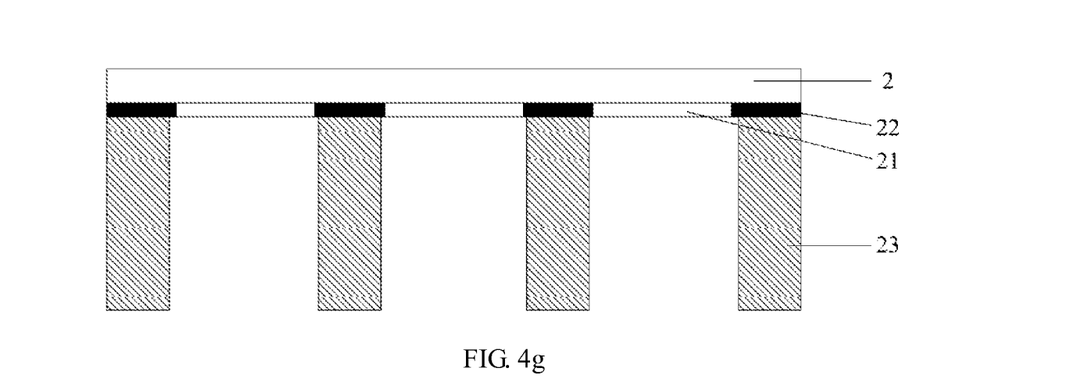

S203, as illustrated in FIG. 4g, depositing and forming the partition wall 23 on the black matrix 22, the material of the partition wall 23 is preferably a high molecular material. In other embodiments, the partition wall can also be formed on the lower substrate.

Figure 4H:
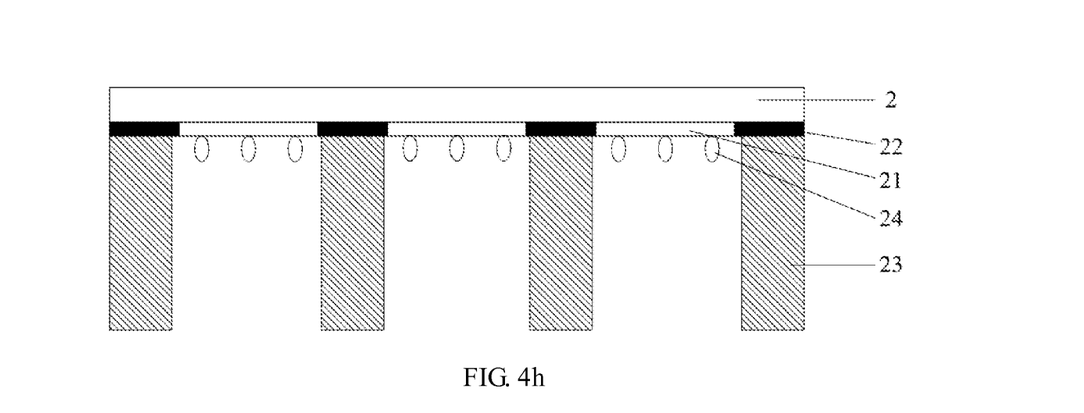

As a preferable solution, subsequent to S201, the following step can be contained:

S204, as illustrated in FIG. 4h, forming the nano gold particles 24 on the common electrode 21.

Specifically, the upper substrate 2 formed with the common electrode 21 is placed in a nano gold solution, and the period lasts more than 5 hours so that the nano gold particles conduct self-assembling on the surface of the common electrode 21 (conductive high molecular material), and also, at the mesh junctions of the conductive high molecular material, many of the nano gold particles are deposited, and form evenly distributed nano gold particle 24 projections.

The fabricating method of the color electrophoretic display panel further comprises:

S3, cell-assembling the upper substrate and the lower substrate. For example, the side of the lower substrate where the pixel electrodes are formed faces the side of the upper substrate where the common electrode is formed.

The upper substrate and the lower substrate are cell-assembled through a conventional cell-assembling process and then the color electrophoretic display panel provided by the embodiments of the present invention can be formed, as illustrated in FIG. 3.

The embodiments of the present invention further provide a display device, which can be a product or part having a display function, such as electronic book, digital signage and an electronic book reader, and the display device comprises the above color electrophoretic display panel provided by the embodiments of the present invention.

As the display device provided by the embodiments of the present invention has the same technical features with the above color electrophoretic display panel provided by the embodiments of the present invention, and then can achieve the same technical effect and solve the same technical problem.

Descriptions made above are merely exemplary embodiments of the invention, but are not used to limit the protection scope of the invention. The protection scope of the invention is determined by attached claims.

The invention claimed is:

1. A color electrophoretic display panel, comprising: a plurality of pixel units each of which comprises more than two different colors of electrophoretic particles, and threshold voltages driving different colors of electrophoretic particles being different, wherein, the color electrophoretic display panel comprises:

an upper substrate;

a lower substrate opposite to the upper substrate;

a plurality of pixel electrodes spaced apart, provided at a side of the lower substrate facing the upper substrate, and each of the pixel electrodes corresponding to one pixel unit;

a common electrode provided at a side of the upper substrate facing the lower substrate;

an electrophoretic layer provided between the pixel electrodes and the common electrode and comprising an oil solution which is mixed with the more than two different colors of electrophoretic particles; and a partition wall which partitions the respective pixel units and partitions the electrophoretic layer within areas of the respective pixel units, a material of the common electrode is a transparent conductive high molecular material, and the common electrode is formed with nano gold particles at its surface.

2. The color electrophoretic display panel according to claim 1, wherein, the more than two different colors of electrophoretic particles comprise a first colored electrophoretic particle, a second colored electrophoretic particle and a third colored electrophoretic particle, and each of the pixel units further comprises a white particle, and the threshold voltages driving the first colored electrophoretic particle, the second colored electrophoretic particle and the third colored electrophoretic particle are respectively a first threshold voltage $E_A$, a second threshold voltage $E_B$ and a third threshold voltage $E_C$.

3. The color electrophoretic display panel according to claim 2, wherein, $E_C<E_B<E_A$, the respective pixel units are configured to be able to apply external drive voltages $E_1$, $E_2$ and $E_3$, wherein, $E_C \leq E_1 < E_B \leq E_2 < E_A \leq E_3$.

4. The color electrophoretic display panel according to claim 3, wherein, the colors of the first colored electrophoretic particle, the second colored electrophoretic particle and the third colored electrophoretic particle comprise red, green, blue, carmine, cyan or yellow.

5. The color electrophoretic display panel according to claim 2, wherein, the colors of the first colored electrophoretic particle, the second colored electrophoretic particle and the third colored electrophoretic particle comprise red, green, blue, carmine, cyan or yellow.

6. The color electrophoretic display panel according to claim 1, wherein, the color electrophoretic display panel further comprises: a black matrix provided on the upper substrate and corresponding to the partition wall.

7. A display device, comprising the color electrophoretic display panel according to claim 1.

8. The color electrophoretic display panel according to claim 1, wherein, the nano gold particles are self-assembled on the surface of the transparent conductive high molecular material, and form evenly distributed nano gold particle projections.

9. A method for operating a color electrophoretic display panel, the color electrophoretic display panel comprising: a plurality of pixel units each of which comprises more than two different colors of electrophoretic particles, and threshold voltages driving different colors of electrophoretic particles being different, wherein, the more than two different colors of electrophoretic particles comprise a first colored electrophoretic particle, a second colored electrophoretic particle and a third colored electrophoretic particle, and each of the pixel units further comprises a white particle, and the threshold voltages driving the first colored electrophoretic particle, the second colored electrophoretic particle and the third colored electrophoretic particle are respectively a first threshold voltage $E_A$, a second threshold voltage $E_B$ and a third threshold voltage $E_C$, wherein, $E_C<E_B<E_A$, the respective pixel units are configured to be able to apply external drive voltages E1, E2 and E3, wherein, $E_C \leq E1 < E_B \leq E2 < E_A \leq E3$, wherein, the pixel units are configured to have the following driving manners:

a driving manner for the pixel units displaying a first color is to apply the voltage E3 and then apply a voltage −E2 to the pixel units;

a driving manner for the pixel units displaying a second color is to apply the voltage E2 and then apply a voltage −E1 to the pixel units; and a driving manner for the pixel units displaying a third color is to apply the voltage E1 to the pixel units.

10. The method according to claim 9, wherein, the color electrophoretic display panel comprises:

an upper substrate;

a lower substrate opposite to the upper substrate;

a plurality of pixel electrodes spaced apart, provided at a side of the lower substrate facing the upper substrate, and each of the pixel electrodes corresponding to one pixel unit;

a common electrode provided at a side of the upper substrate facing the lower substrate;

an electrophoretic layer provided between the pixel electrodes and the common electrode and comprising an oil solution which is mixed with the more than two different colors of electrophoretic particles; and a partition wall which partitions the respective pixel units and partitions the electrophoretic layer within areas of the respective pixel units.

11. The method according to claim 10, wherein, a material of the common electrode is a transparent conductive high molecular material, and the common electrode is formed with nano gold particles at its surface.

12. The color electrophoretic display panel according to claim 10, wherein, a material of the partition wall is a high molecular material.

* * * * *